US010503283B2

(12) United States Patent
Wang et al.

(10) Patent No.: US 10,503,283 B2
(45) Date of Patent: Dec. 10, 2019

(54) ACTIVE PEN, ACTIVE PEN TOUCH SYSTEM AND METHOD FOR PERFORMING TOUCH USING ACTIVE PEN

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Chao Wang, Beijing (CN); Zhixiang Fang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/016,821

(22) Filed: Jun. 25, 2018

(65) Prior Publication Data
US 2019/0204938 A1 Jul. 4, 2019

(30) Foreign Application Priority Data
Jan. 2, 2018 (CN) .......................... 2018 1 0002642

(51) Int. Cl.
*G06F 3/0354* (2013.01)
*G06F 3/044* (2006.01)
*G06F 3/038* (2013.01)
*G06F 3/041* (2006.01)

(52) U.S. Cl.
CPC ........ *G06F 3/03545* (2013.01); *G06F 3/0383* (2013.01); *G06F 3/0441* (2019.05); *G06F 3/0442* (2019.05); *G06F 3/04162* (2019.05)

(58) Field of Classification Search
CPC ................. G06F 3/033; G06F 3/03545–03546
See application file for complete search history.

(56) References Cited

U.S. PATENT DOCUMENTS

| | | | | |
|---|---|---|---|---|
| 7,868,878 B2* | 1/2011 | Craven-Bartle | ....... | G03B 15/00 345/179 |
| 9,013,455 B2* | 4/2015 | Mercea | .................. | G06F 1/266 345/179 |
| 9,501,091 B2* | 11/2016 | Takeda | ...................... | G06F 3/03 |
| 9,529,457 B2* | 12/2016 | Sakuramata | ........ | G06F 3/03545 |
| 2016/0070372 A1* | 3/2016 | Hamaguchi | ............. | G06F 3/044 345/179 |
| 2018/0164904 A1* | 6/2018 | Qiao | ..................... | G06F 3/0383 |

* cited by examiner

*Primary Examiner* — Gene W Lee
(74) *Attorney, Agent, or Firm* — Westman, Champlin & Koehler, P.A.

(57) ABSTRACT

The present disclosure provides an active pen, an active pen touch system and a method for performing touch using an active pen. The active pen comprises an active pen main body comprising a pen tip and a pen body, wherein the pen tip is configured to receive a signal from a touch screen; a judgment circuit electrically connected to the pen tip, and configured to judge whether the signal is a synchronization control signal or an electrostatic signal; and an electrostatic discharge switch circuit electrically connected between the judgment circuit and the pen body, and configured to be turned on on condition that the signal is an electrostatic signal, so as to electrically connect the judgment circuit to the pen body.

20 Claims, 2 Drawing Sheets

ACTIVE PEN, ACTIVE PEN TOUCH SYSTEM AND METHOD FOR PERFORMING TOUCH USING ACTIVE PEN

CROSS-REFERENCE TO RELATED APPLICATION(S)

This application claims priority to the Chinese Patent Application No. 201810002642.3, filed on Jan. 2, 2018, which is incorporated herein by reference in its entirety.

TECHNICAL FIELD

The present disclosure relates to the field of display technology, and more specifically, to an active pen, an active pen touch system and a method for performing touch using an active pen.

BACKGROUND

With the promotion of active pens, more and more touch screen products begin to be equipped with active pens. However, these electronic products are faced with the threat of Electrostatic Discharge (ESD) during production and use, and may cause performance degradation or even damage of the products due to the ESD.

SUMMARY

An aspect of the present disclosure provides an active pen. The active pen comprises: an active pen main body comprising a pen tip and a pen body, wherein the pen tip is configured to receive a signal from a touch screen; a judgment circuit electrically connected to the pen tip, and configured to judge whether the signal is a synchronization control signal or an electrostatic signal; and an electrostatic discharge switch circuit electrically connected between the judgment circuit and the pen body, and configured to be turned on on condition that the signal is an electrostatic signal, so as to electrically connect the judgment circuit to the pen body.

In an embodiment, the electrostatic discharge switch circuit is a switch diode.

In an embodiment, the active pen further comprises: a synchronization circuit electrically connected to the judgment circuit, and configured to receive the signal on condition that the signal is the synchronization control signal; and a coordinate driving transmission circuit electrically connected to the pen tip, and configured to transmit a driving signal to the touch screen through the pen tip. The synchronization circuit is configured to control the coordinate driving transmission circuit to transmit the driving signal to the touch screen according to the synchronization control signal when the synchronization control signal is received.

In an embodiment, the active pen further comprises: a pressure sensor configured to sense a pressure of a contact between the pen tip and the touch screen and generate a pressure signal according to the pressure; and a pressure signal transmission circuit electrically connected to the pressure sensor and configured to transmit the pressure signal to the touch screen through the pen tip. The synchronization circuit is further configured to control the pressure signal transmission circuit to transmit the pressure signal to the touch screen according to the synchronization control signal.

In an embodiment, in the active pen, the judgment circuit is configured to judge whether the signal is a synchronization control signal based on an encoding feature of a communication between the active pen and the touch screen, and determine the signal as an electrostatic signal on condition that the signal is not a synchronization control signal.

A second aspect of the present disclosure provides an active pen touch system, comprising a touch screen and the active pen described above.

In an embodiment, a ground line is provided between adjacent signal transmission leads and/or adjacent signal reception leads in the touch screen.

A third aspect of the present disclosure provides a method for performing touch using an active pen, wherein the active pen comprises a pen tip and a pen body. The method comprises: contacting, by the pen tip of the active pen, with the touch screen to receive a signal from the touch screen; judging whether the signal is a synchronization control signal or an electrostatic signal; and electrically connecting the pen tip to the pen body on condition that the signal is an electrostatic signal.

In an embodiment, the method further comprises: on condition that the signal is a synchronization control signal, transmitting a driving signal to the touch screen according to the synchronization control signal.

In an embodiment, the method further comprises: sensing a pressure of a contact between the pen tip and the touch screen, and generating a pressure signal according to the pressure; and transmitting a pressure signal to the touch screen through the pen tip according to the synchronization control signal.

In an embodiment, the step of judging whether the signal is a synchronization control signal or an electrostatic signal comprises: judging whether the signal is a synchronization control signal or an electrostatic signal based on an encoding feature of a communication between the active pen and the touch screen, and determining the signal as an electrostatic signal on condition that the signal is not a synchronization control signal.

BRIEF DESCRIPTION OF THE ACCOMPANYING DRAWINGS

Specific embodiments of the present disclosure will be further described in detail below in conjunction with the accompanying drawings.

DETAILED DESCRIPTION

In order to more clearly illustrate the present disclosure, the present disclosure will be further described below in conjunction with the preferred embodiments and the accompanying drawings. Like parts in the accompanying drawings are denoted by the same reference signs. It should be understood by those skilled in the art that the following detailed description is illustrative rather than restrictive, and should not limit the protection scope of the present disclosure.

Figure 1:
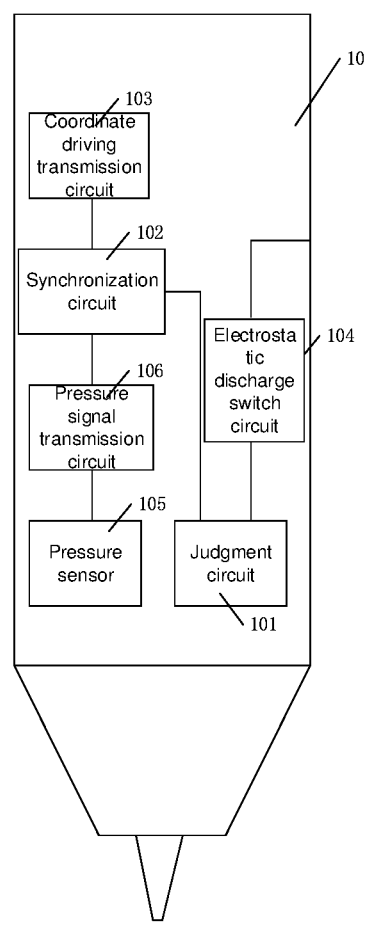
FIG. 1 illustrates a schematic diagram of an active pen according to an embodiment of the present disclosure.
Figure 2:
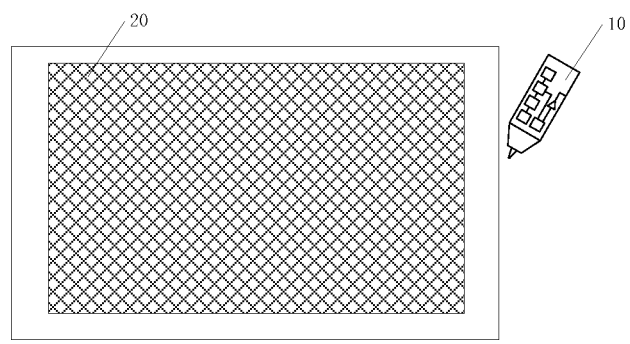
FIG. 2 illustrates a schematic diagram of an active pen touch system according to an embodiment of the present disclosure.

As shown in both FIG. 1 and FIG. 2, an embodiment of the present disclosure provides an active pen. The active pen comprises an active pen main body 10 having a pen tip and a pen body. The pen tip may receive a signal from a touch screen.

The active pen further comprises a judgment circuit 101, a synchronization circuit 102, a coordinate driving transmission circuit 103, and an electrostatic discharge switch circuit 104. In an embodiment, the judgment circuit 101, the synchronization circuit 102, the coordinate driving transmission circuit 103 and the electrostatic discharge switch circuit 104 may be provided in the active pen main body 10.

It should be understood that although it is described in the above description that the active pen comprises the judgment circuit 101, the synchronization circuit 102, the coordinate driving transmission circuit 103, and the electrostatic discharge switch circuit 104, in some embodiments, the active pen may comprise more or less circuit components. For example, in an embodiment, the active pen may comprise only the judgment circuit 101 and the electrostatic discharge switch circuit 104. For another example, in an embodiment, the active pen may further comprise a pressure sensor 105 and a pressure signal transmission circuit 106 (as described in detail below).

The judgment circuit 101 is electrically connected to the pen tip, and is configured to judge whether the signal received through the pen tip of the active pen main body 10 is a synchronization control signal transmitted by the touch screen 20 or an electrostatic signal of the touch screen 20.

The electrostatic discharge switch circuit 104 is electrically connected between the judgment circuit 101 and the pen body. The electrostatic discharge switch circuit 104 is configured to be turned on on condition that the signal is an electrostatic signal, so as to electrically connect the judgment circuit 101 to the pen body.

The synchronization circuit 102 is electrically connected to the judgment circuit 101, and is configured to control the coordinate driving transmission circuit 103 to transmit a driving signal to the touch screen 20 through the pen tip of the active pen main body 10 according to the synchronization control signal.

The coordinate driving transmission circuit 103 is electrically connected to the pen tip and is configured to transmit the driving signal to the touch screen through the pen tip.

In an embodiment, the synchronization circuit 102 is configured to control the coordinate driving transmission circuit 103 to transmit the driving signal to the touch screen according to the synchronization control signal when the synchronization control signal is received.

When the active pen according to the present embodiment is used to touch a touch screen (for example, the touch screen 20), if there is static electricity on the touch screen 20, the static electricity on the touch screen 20 may be completely released at any time by active contact between a human hand and the pen body of the active pen main body 10 (i.e., the active pen-the human body-the ground). In this way, the static electricity on the touch screen 20 may not be accumulated, and electronic components of the touch screen 20 and the entire electronic product are not harmed by the electrostatic discharge, thereby increasing the lifetime and the performance experiences of the touch screen 20 and the entire electronic product.

In a specific implementation, the electrostatic discharge switch circuit 104 in the present embodiment may be a switch diode. A voltage of an electrostatic signal is often much larger than a turn-on voltage of the switch diode, and is enough to turn on the switch diode. In this way, the judgment circuit 101 can discharge static electricity through the switch diode and the pen body of the active pen main body 10 by turning on the switch diode through the electrostatic signal in a simple, effective, and reliable manner.

In a specific implementation, as described above, the active pen according to the present embodiment may further comprise a pressure sensor 105 and a pressure signal transmission circuit 106. In an embodiment, the pressure sensor 105 and the pressure signal transmission circuit 106 may be provided in the active pen main body 10.

The pressure sensor 105 is configured to sense a pressure of a contact between the pen tip and the touch screen and generate a pressure signal according to the pressure.

The pressure signal transmission circuit 106 is electrically connected to the pressure sensor 105 and is configured to transmit the pressure signal to the touch screen through the pen tip.

In an embodiment, the synchronization circuit 102 is further configured to control the pressure signal transmission circuit 106 to transmit the pressure signal to the touch screen 20 through the pen tip of the active pen main body 10 according to the synchronization control signal, so as to realize, for example, handwriting with different thicknesses.

In a specific implementation, in the present embodiment, the judgment circuit 101 is configured to judge whether the signal received through the pen tip of the active pen main body 10 is a synchronization control signal transmitted by the touch screen 20 based on an encoding feature of a communication between the active pen and the touch screen 20, and determine the signal as an electrostatic signal of the touch screen 20 on condition that the signal is not a synchronization control signal.

Different active pen communication protocols are different, but have similar basic principles. Any communication protocol has its own encoding feature. By taking FSK communication encoding as an example, signal transmission between the active pen and a control chip (touch IC) of the touch screen 20 is performed according to an FSK encoding protocol. An FSK encoding feature may be written into a dock position of a signal. In this way, the judgment circuit 101 can simply and accurately determine whether the signal received through the pen tip of the active pen main body 10 is a synchronization control signal transmitted by the touch screen 20 only by reading whether a dock of the signal received through the pen tip of the active pen main body 10 has an FSK communication encoding feature, and if not, judge that the signal is an electrostatic signal of the touch screen 20.

It should be illustrated that the judgment circuit 101, the synchronization circuit 102, the coordinate driving transmission circuit 103, and the pressure signal transmission circuit 106 mentioned in the present embodiment may be implemented in a driving chip of the active pen itself in a form of software modules, for example, the corresponding program may be written programmatically into a firmware such as the driving chip. In this case, an anode of the switch diode is connected to a corresponding functional pin of the driving chip, and a cathode of the switch diode is connected to the pen body of the main body. The coordinate driving transmission circuit 103 transmits the driving signal to the pen tip of the active pen main body 10 through the corresponding functional pin of the driving chip and then transmits the driving signal to the touch screen 20. The pressure sensor 105 is also connected to the corresponding functional pin of the driving chip.

As shown in FIG. 2, another embodiment of the present disclosure provides an active pen touch system comprising the touch screen 20 and the active pen according to the above embodiments.

With the active pen touch system according to the present embodiment, if there is static electricity on the touch screen 20, the static electricity on the touch screen 20 may be completely released at any time by active contact between a human hand and the pen body of the active pen main body 10 (i.e., the active pen-the human body-the ground). In this way, the static electricity on the touch screen 20 may not be accumulated, and electronic components of the touch screen 20 and the entire electronic product are not harmed by the electrostatic discharge, thereby increasing the lifetime and the performance experiences of the touch screen 20 and the entire electronic product.

Figure 3:
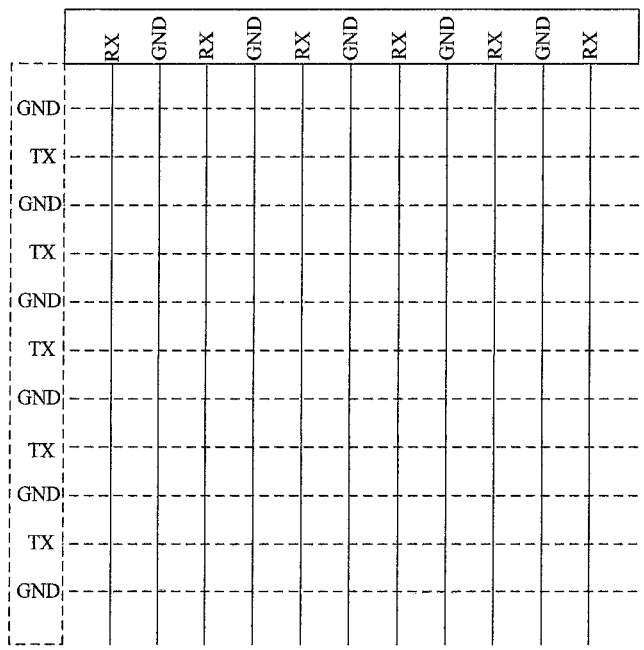
FIG. 3 illustrates a schematic diagram of signal transmission leads, signal reception leads, and ground wires in a touch screen of an active pen touch system according to an embodiment of the present disclosure.

In a specific implementation, as shown in FIG. 3, in the active pen touch system according to the present embodiment, a ground wire is provided between adjacent signal transmission leads and/or between adjacent signal reception leads in the touch screen 20. In an embodiment, the signal transmission leads and the signal reception leads in the touch screen 20 are provided on different layers (which are represented by solid lines and dashed lines in FIG. 3), and the signal transmission leads and the signal reception leads intersect (usually are orthogonal to each other) in an orthogonal projection direction. The design in which a ground wire is provided between each two signal transmission leads and/or between each two signal reception leads in the touch screen 20 takes the problem of ESD protection into account, signal transmission (RX) leads and signal reception (TX) leads are separated by ground (GND) wires in the touch screen 20, and the RX leads and the TX leads are formed to be wrapped by the GND wires. In addition, the RX leads and the TX leads in the entire touch screen 20 are alternately covered by the GND wires, and by taking the touch screen using an LCD display module (LCM) as an example, GND wiring of touch signal lines (including signal transmission leads and signal reception leads) may further be designed to be connected to the LCM. In this way, ESD interference generated by the LCM is connected to the touch signal lines of the touch screen 20, which can effectively shield the interference between the signals and timely dissipate static electricity accumulation.

Figure 4:
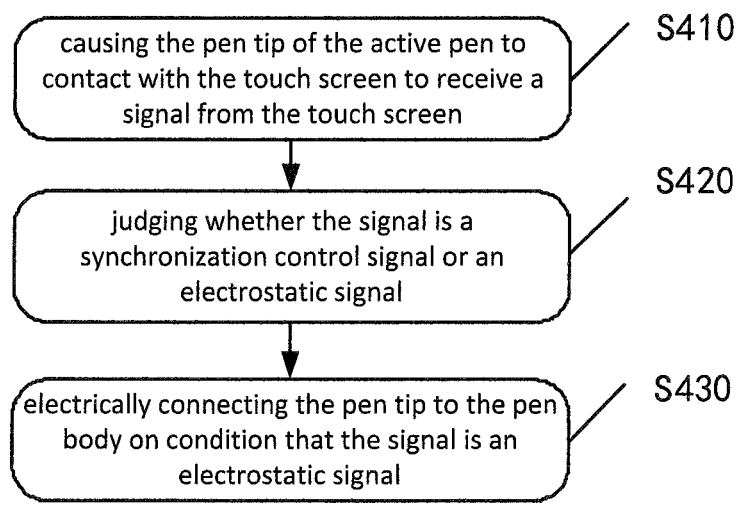
FIG. 4 illustrates a flowchart of a method for performing touch using an active pen according to an embodiment of the present disclosure.

As shown in FIG. 4, yet another embodiment of the present disclosure provides a method for performing touch using an active pen. The active pen comprises a pen tip and a pen body.

The method comprises the following steps.

In S410, causing the pen tip of the active pen to contact with the touch screen to receive a signal from the touch screen.

In S420, judging whether the signal is a synchronization control signal or an electrostatic signal.

In S430, electrically connecting the pen tip to the pen body on condition that the signal is an electrostatic signal.

With the method for performing touch using an active pen according to the present embodiment, if there is static electricity on the touch screen 20, the static electricity on the touch screen 20 may be completely released at any time by active contact between a human hand and the pen body of the active pen main body 10 (i.e., the active pen-the human body-the ground). In this way, the static electricity on the touch screen 20 may not be accumulated, and electronic components of the touch screen 20 and the entire electronic product are not harmed by the electrostatic discharge, thereby increasing the lifetime and the performance experiences of the touch screen 20 and the entire electronic product.

In an embodiment, the method further comprises: on condition that the signal is a synchronization control signal, transmitting a driving signal to the touch screen according to the synchronization control signal.

In an embodiment, the method further comprises: sensing a pressure of a contact between the pen tip and the touch screen, and generating a pressure signal according to the pressure; and transmitting a pressure signal to the touch screen through the pen tip according to the synchronization control signal.

In an embodiment, the step of judging whether the signal is a synchronization control signal or an electrostatic signal comprises: judging whether the signal is a synchronization control signal or an electrostatic signal based on an encoding feature of a communication between the active pen and the touch screen, and determining the signal as an electrostatic signal on condition that the signal is not a synchronization control signal. Different active pen communication protocols are different, but have similar basic principles. Any communication protocol has its own encoding feature. By taking FSK communication encoding as an example, signal transmission between the active pen and a control chip (touch IC) of the touch screen is performed according to an FSK encoding protocol. Therefore, it can simply and accurately be determined whether the signal received through the pen tip of the active pen main body is a synchronization control signal transmitted by the touch screen or an electrostatic signal of the touch screen only by judging whether the signal received through the pen tip of the active pen main body has an encoding feature of a communication between the active pen and the touch screen.

In the description of the present disclosure, it should be illustrated that an orientation or positional relationship indicated by the terms "up", "down", etc. is an orientation or positional relationship shown in the accompanying drawings, is merely for the convenience of describing the present disclosure and simplifying the description, rather than indicating or implying that the apparatus or element referred must have a particular orientation or must be constructed and operated in a particular orientation, and therefore should not be construed as limitations on the present disclosure. Unless expressly stated or specified otherwise, the terms "mounted," "connected to," and "connected with" shall be interpreted broadly and may be, for example, fixed connections, removable connections, or integral connections; or may be mechanical connections, or electrical connections; or may be direct connections, or indirect connections through an intermediary medium, or internal connections between two components. Those of ordinary skill in the art can understand the specific meanings of the above terms in the present disclosure according to specific circumstances.

It should also be illustrated that in the description of the present disclosure, relational terms such as first and second, etc. are only used to distinguish one entity or operation from another entity or operation without necessarily requiring or implying that there is any such actual relationship or order between these entities or operations. Moreover, the terms "comprises", "includes" or any other variation thereof are intended to cover a non-exclusive inclusion, so that a process, method, article, or device which comprises a series of elements comprises not only these elements but also comprises other elements which are not explicitly listed, or elements inherent to such a process, method, article, or device. In a case of no more limitation, an element defined by a sentence "including one . . . " does not exclude that there is another element which is the same as the element in the process, the method, the article, or the device including the element.

Obviously, the above embodiments of the present disclosure are merely examples for clearly illustrating the present disclosure, and are not limitations on the embodiments of the present disclosure. For those of ordinary skill in the art, other changes or modifications in other forms can also be made based on the above description. All embodiments cannot be exhaustively described herein, and any obvious changes or modifications derived from the technical solutions of the present disclosure are still within the protection scope of the present disclosure.

We claim:

1. An active pen, comprising:
    an active pen main body comprising a pen tip and a pen body, wherein the pen tip is configured to receive a signal from a touch screen;
    a judgment circuit electrically connected to the pen tip, and configured to judge whether the signal is a synchronization control signal or an electrostatic signal; and
    an electrostatic discharge switch circuit electrically connected between the judgment circuit and the pen body, and configured to be turned on on condition that the signal is an electrostatic signal, so as to electrically connect the judgment circuit to the pen body.

2. The active pen according to claim 1, wherein the electrostatic discharge switch circuit is a switch diode.

3. An active pen touch system, comprising a touch screen and the active pen according to claim 2.

4. The active pen touch system according to claim 3, wherein
    a ground line is provided between adjacent signal transmission leads in the touch screen, and
    a ground line is provided between adjacent signal reception leads in the touch screen.

5. The active pen according to claim 1, further comprising:
    a synchronization circuit electrically connected to the judgment circuit, and configured to receive the signal on condition that the signal is the synchronization control signal; and
    a coordinate driving transmission circuit electrically connected to the pen tip, and configured to transmit a driving signal to the touch screen through the pen tip,
    wherein the synchronization circuit is configured to control the coordinate driving transmission circuit to transmit the driving signal to the touch screen according to the synchronization control signal when the synchronization control signal is received.

6. An active pen touch system, comprising a touch screen and the active pen according to claim 5.

7. The active pen touch system according to claim 6, wherein
    a ground line is provided between adjacent signal transmission leads in the touch screen, and
    a ground line is provided between adjacent signal reception leads in the touch screen.

8. The active pen according to claim 5, further comprising:
    a pressure sensor configured to sense a pressure of a contact between the pen tip and the touch screen and generate a pressure signal according to the pressure; and
    a pressure signal transmission circuit electrically connected to the pressure sensor and configured to transmit the pressure signal to the touch screen through the pen tip,
    wherein the synchronization circuit is further configured to control the pressure signal transmission circuit to transmit the pressure signal to the touch screen according to the synchronization control signal.

9. An active pen touch system, comprising a touch screen and the active pen according to claim 8.

10. The active pen touch system according to claim 9, wherein
    a ground line is provided between adjacent signal transmission leads in the touch screen, and
    a ground line is provided between adjacent signal reception leads in the touch screen.

11. The active pen according to claim 1, wherein the judgment circuit is configured to judge whether the signal is a synchronization control signal based on an encoding feature of a communication between the active pen and the touch screen, and determine the signal as an electrostatic signal on condition that the signal is not a synchronization control signal.

12. An active pen touch system, comprising a touch screen and the active pen according to claim 11.

13. The active pen touch system according to claim 12, wherein
    a ground line is provided between adjacent signal transmission leads in the touch screen, and
    a ground line is provided between adjacent signal reception leads in the touch screen.

14. An active pen touch system, comprising a touch screen and the active pen according to claim 1.

15. The active pen touch system according to claim 14, wherein a ground line is provided between adjacent signal transmission leads in the touch screen.

16. The active pen touch system according to claim 14, wherein a ground line is provided between adjacent signal reception leads in the touch screen.

17. A method for performing touch using an active pen, wherein the active pen comprises a pen tip and a pen body, the method comprising:
    contacting, by the pen tip of the active pen, with the touch screen to receive a signal from the touch screen;
    judging whether the signal is a synchronization control signal or an electrostatic signal; and
    electrically connecting the pen tip to the pen body on condition that the signal is an electrostatic signal.

18. The method according to claim 17, further comprising:
    on condition that the signal is a synchronization control signal, transmitting a driving signal to the touch screen according to the synchronization control signal.

19. The method according to claim 18, further comprising:
    sensing a pressure of a contact between the pen tip and the touch screen, and generating a pressure signal according to the pressure; and
    transmitting a pressure signal to the touch screen through the pen tip according to the synchronization control signal.

20. The method according to claim 17, wherein the step of judging whether the signal is a synchronization control signal or an electrostatic signal comprises:

judging whether the signal is a synchronization control signal or an electrostatic signal based on an encoding feature of a communication between the active pen and the touch screen, and determining the signal as an electrostatic signal on condition that the signal is not a synchronization control signal.

* * * * *